(12) United States Patent
Hayakawa et al.

(10) Patent No.: US 11,077,806 B2
(45) Date of Patent: *Aug. 3, 2021

(54) COMPLEX HARNESS

(71) Applicant: Hitachi Metals, Ltd., Tokyo (JP)

(72) Inventors: Yoshikazu Hayakawa, Hitachi (JP); Hirotaka Eshima, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,177

(22) Filed: Mar. 18, 2019

(65) Prior Publication Data

US 2019/0210543 A1 Jul. 11, 2019

Related U.S. Application Data

(63) Continuation of application No. 15/869,898, filed on Jan. 12, 2018, now Pat. No. 10,279,756, which is a (Continued)

(30) Foreign Application Priority Data

Apr. 20, 2012 (JP) ................................ 2012-096729
Sep. 28, 2012 (JP) ................................ 2012-215636

(51) Int. Cl.
*H01B 11/04* (2006.01)
*B60R 16/02* (2006.01)
(Continued)

(52) U.S. Cl.
CPC ........... *B60R 16/0215* (2013.01); *H01B 3/30* (2013.01); *H01B 3/50* (2013.01); *H01B 3/54* (2013.01); *H01B 7/0045* (2013.01); *H01B 9/003* (2013.01)

(58) Field of Classification Search
CPC ...... H01B 11/04; H01B 7/04; H01B 11/1033; H01B 11/1091; H01B 11/1895; H02G 15/04
See application file for complete search history.

(56) References Cited

U.S. PATENT DOCUMENTS 3,489,844 A * 1/1970 Motley ................. H01B 11/00
174/32
4,605,818 A * 8/1986 Arroyo ................ G02B 6/4436
156/54
(Continued)

FOREIGN PATENT DOCUMENTS

DE 965143 * 6/1957
JP S63-153489 U 12/1976
(Continued)

OTHER PUBLICATIONS

United States Notice of Allowance dated Jan. 3, 2019, in U.S. Appl. No. 16/869,898.
(Continued)

*Primary Examiner* — Chau N Nguyen
(74) *Attorney, Agent, or Firm* — McGinn I.P. Law Group, PLLC

(57) ABSTRACT

A harness for a vehicle, configured to be attachable to a vehicle body, includes a cable including a plurality of electric wires, each of which includes a center conductor and an insulation that covers the center conductor, a separator including a paper, a non-woven fabric, or a resin tape that covers and contacts with the plurality of electric wires, and an outer sheath that covers the separator, a rubber member provided along a longitudinal direction of a part of the cable, and a fixing member for attaching the cable to the vehicle body. The fixing member is attached to an outer surface of the outer sheath through the rubber member.

18 Claims, 2 Drawing Sheets

Related U.S. Application Data continuation of application No. 15/229,667, filed on Aug. 5, 2016, now Pat. No. 9,902,347, which is a continuation of application No. 14/630,346, filed on Feb. 24, 2015, now Pat. No. 9,463,756, which is a continuation of application No. 13/865,881, filed on Apr. 18, 2013, now Pat. No. 9,000,301.

(51) Int. Cl.
*H01B 7/00* (2006.01)
*H01B 3/30* (2006.01)
*H01B 3/50* (2006.01)
*H01B 3/54* (2006.01)
*H01B 9/00* (2006.01)

(56) References Cited

U.S. PATENT DOCUMENTS

| | | | |
|---|---|---|---|
| 4,790,502 | A | 12/1988 | Saegusa |
| 5,576,515 | A | 11/1996 | Bleich et al. |
| 5,808,371 | A | 9/1998 | Kon'l et al. |
| 5,917,249 | A | 8/1999 | Kon'l et al. |
| 6,020,811 | A | 2/2000 | Saito et al. |
| 6,147,309 | A | 11/2000 | Mottine et al. |
| 6,166,453 | A | 12/2000 | Kon'l et al. |
| 6,182,807 | B1 | 2/2001 | Saito et al. |
| 6,243,018 | B1 | 6/2001 | Saito et al. |
| 6,300,573 | B1 * | 10/2001 | Horie .................. H01B 7/1895 174/113 C |
| 6,401,891 | B1 | 6/2002 | Saito et al. |
| 6,844,500 | B2 | 1/2005 | Williams et al. |
| 7,126,055 | B1 | 10/2006 | Low et al. |
| 7,132,604 | B2 | 11/2006 | Scheidecker et al. |
| 7,342,172 | B1 | 3/2008 | Wang et al. |
| 7,514,632 | B2 | 4/2009 | Lin |
| 8,089,000 | B2 | 1/2012 | Van Der Meer |
| 8,859,902 | B2 | 10/2014 | Matsuda et al. |
| 9,000,301 | B2 | 4/2015 | Hayakawa et al. |
| 9,463,756 | B2 | 10/2016 | Hayakawa et al. |
| 10,279,756 | B2 * | 5/2019 | Hayakawa .......... B60R 16/0215 |
| 2001/0028241 | A1 | 10/2001 | Saito et al. |
| 2002/0043964 | A1 | 4/2002 | Saito et al. |
| 2002/0148633 | A1 | 10/2002 | Kanda |
| 2003/0001434 | A1 | 1/2003 | Saito et al. |
| 2003/0083797 | A1 | 5/2003 | Yokoyama et al. |
| 2003/0098211 | A1 | 5/2003 | Saito et al. |
| 2003/0121694 | A1 * | 7/2003 | Grogl .................. H01B 7/041 174/113 R |
| 2005/0065696 | A1 | 3/2005 | Yokoyama et al. |
| 2005/0168072 | A1 | 8/2005 | Saito et al. |
| 2008/0204007 | A1 | 8/2008 | Kim et al. |
| 2010/0147549 | A1 | 6/2010 | Shiina |
| 2011/0088926 | A1 | 4/2011 | Grogl et al. |
| 2011/0094796 | A1 | 4/2011 | Toyama et al. |
| 2011/0127996 | A1 | 6/2011 | Nishikawa et al. |
| 2011/0174516 | A1 | 7/2011 | Slahaan et al. |
| 2012/0198933 | A1 | 8/2012 | Steinbrink et al. |

FOREIGN PATENT DOCUMENTS

| | | |
|---|---|---|
| JP | 55-146614 U | 10/1980 |
| JP | H02-223109 A | 9/1990 |
| JP | H 9-218214 A | 8/1997 |
| JP | H 11-105880 A | 4/1999 |
| JP | 2001-141137 A | 5/2001 |
| JP | 2001-266655 A | 9/2001 |
| JP | 3308542 B2 | 7/2002 |
| JP | 2003-92028 A | 3/2003 |
| JP | 2003-137081 A | 5/2003 |
| JP | 2004-039447 | 2/2004 |
| JP | 2004-111178 A | 4/2004 |
| JP | 2004-259683 A | 9/2004 |
| JP | 2005-166450 A | 6/2005 |
| JP | 2008-351322 A | 12/2006 |
| JP | 2008-123827 A | 5/2008 |
| JP | U-3143099 | 7/2008 |
| JP | 2008-209197 A | 9/2008 |
| JP | 2010-043889 A | 2/2010 |
| JP | 2010-146755 A | 7/2010 |
| JP | 2011-124117 A | 6/2011 |
| JP | 2019-021645 A | 2/2019 |

OTHER PUBLICATIONS

United States Office Action dated Jul. 13, 2018, in U.S. Appl. No. 15/869,898.
Japanese Office Action dated Jul. 6, 2018 in Japanese Application No. 2017-163895 with an English translation thereof.
Office Action in U.S. Appl. No. 15/229,667 dated Jun. 30 2017.
Notice of Allowance in U.S. Appl. No. 15/229,667 dated Nov. 16, 2017.
Japanese Office Action dated May 10, 2016 with an English translation.
Japanese Office Action dated Jun. 5, 2015 with an English translation.
U.S. Notice of Allowance dated Dec. 31, 2014 in co-pending U.S. Appl. No. 13/886,881.
U.S. Office Action dated Oct. 31, 2014 in co-pending U.S. Appl. No. 13/885,881.
U.S. Office Action dated Sep. 19, 2014 in co-pending U.S. Appl. No. 13/865,881.
Japanese Office Action dated Aug. 22, 2014 with English Translation.
Japanese Office Action dated Sep. 10, 2013 with English Translation.
Notification of Reason(s) for Refusal dated Apr. 23, 2013 with English Translation.
U.S. Office Action dated Aug. 4, 2014 in co-pending U.S. Appl. No. 13/865,881.
Office Action in U.S. Appl. No. 14/630,346 dated Feb. 29, 2016.
Notice of Allowance in U.S. Appl. No. 14/630,346 dated Jun. 6, 2016.
Office Action (Decision of Refusal) of JP 2015-153331, dated Nov. 8, 2016, and English translation thereof.
Office Action of JP 2016-060097, dated Dec. 16, 2016, and English translation thereof.
United States Office Action dated Jan. 25, 2017 in U.S. Appl. No. 14/630,360.
United States Office Action dated Jul. 14, 2017 in U.S. Appl. No. 16/630,360.
United States Notice of Allowance dated Sep. 6, 2017, in U.S. Appl. No. 14/630,360.
Japanese Office Action dated Jan. 27, 2017 and English translation thereof.
Japanese Office Action, dated Jan. 23, 2020, in Japanese Application No. 2019-037093 and English Translation thereof.
Japanese Office Action dated Sep. 1, 2020, in corresponding Japanese Application No. 2019-037093 with an English Translation thereof.
Japanese Office Action, dated Jun. 8, 2021, in Japanese Application No. 2019-37093 and English Translation thereof.

* cited by examiner

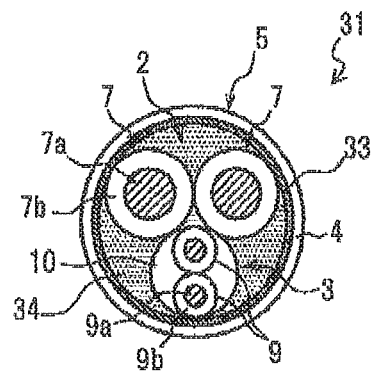
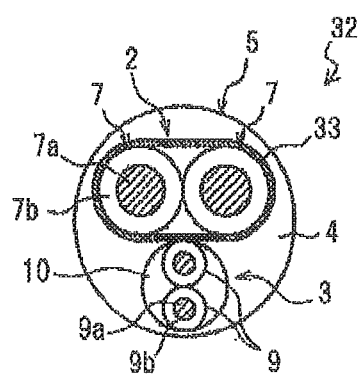
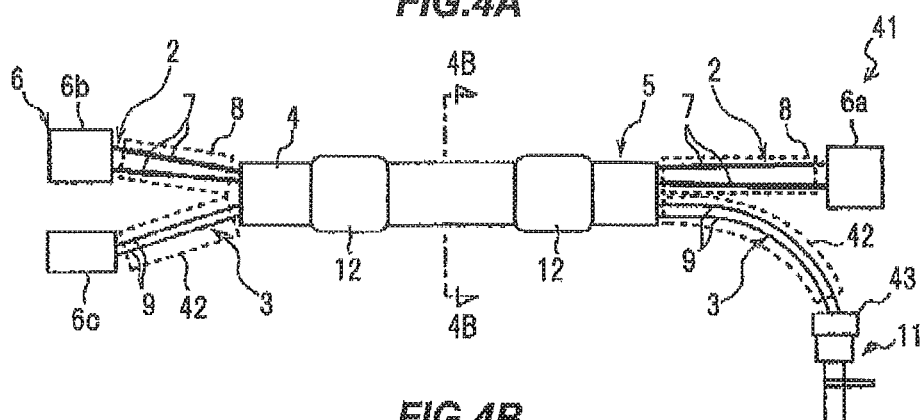

COMPLEX HARNESS

The present application is a Continuation Application of U.S. patent application Ser. No. 15/869,898, filed on Jan. 12, 2018, which is a Continuation Application of U.S. patent application Ser. No. 15/229,667, filed on Aug. 5, 2016, now U.S. Pat. No. 9,902,347 B2, issued on Feb. 27, 2018, which is a Continuation Application of U.S. patent application Ser. No. 14/630,346, filed on Feb. 24, 2015, now U.S. Pat. No. 9,463,756 B2, issued on Oct. 11, 2016, which is a Continuation Application of U.S. patent application Ser. No. 13/865,881, filed on Apr. 18, 2013, now U.S. Pat. No. 9,000,301 B2, issued on Apr. 7, 2015, which is based on and claims priority from Japanese Patent Application Nos. 2012-096729 and 2012-215636 filed on Apr. 20, 2012 and Sep. 28, 2012, respectively, the entire contents of which are incorporated herein by reference.

BACKGROUND OF THE INVENTION

1. Field of the Invention

The invention relates to a complex harness for a vehicle.

2. Description of the Related Art

An ABS sensor used in an ABS (Anti-lock Brake System) of a vehicle is conventionally known. The ABS sensor is to measure a rotation speed of a wheel and a sensor portion (sensor head) of the ABS sensor is provided in the vicinity of the wheel. The sensor portion provided in the vicinity of the wheel is connected to a control device (electronic control unit) provided on a vehicle body via an ABS sensor cable.

In recent years, an electric brake in which braking is controlled by electricity in place of hydraulic pressure is becoming popular. An electric parking brake (EPB) which is a motorized parking brake is also known and, in the present specification, the electric brake is meant to include also the electric parking brake. In the electric brake, a brake caliper (actuator) provided on a wheel is connected to a control device provided on a vehicle body via an electric brake cable (see, e.g., JP-A-2003-92028).

SUMMARY OF THE INVENTION

The conventional ABS sensor cable and the electric brake cable are separately installed even though both cables are connected to substantially the same positions. Thus, the installation thereof is desired to be improved since the wiring space of the vehicle may be limited and the wiring work thereof may be thereby complicated.

Accordingly, it is an object of the invention to provide a complex harness that allows the efficient use of the wiring space of a vehicle and the facilitation of the wiring work.

(1) According to one embodiment of the invention, a complex harness comprises a composite cable comprising an electric brake cable, an ABS sensor cable and an outer sheath, wherein the electric brake cable and the ABS sensor cable are integrated by being commonly covered with the outer sheath.

In the above embodiment (1) of the invention, the following modifications and changes can be made.

(i) The complex harness further comprises a connector at an end portion of at least one of the electric brake cable and the ABS sensor cable, wherein the electric brake cable and the ABS sensor cable are separated at an end portion of the composite cable.

(ii) The ABS sensor cable comprises two signal wires and an inner sheath to collectively cover the two signal wires.

(iii) The outer sheath comprises a thermoplastic resin, and wherein the inner sheath comprises a crosslinked thermoplastic resin.

(iv) The outer sheath comprises a thermoplastic urethane, and wherein the inner sheath comprises a crosslinked thermoplastic urethane.

(v) The crosslinked thermoplastic urethane is formed by crosslinking the thermoplastic urethane with a silane coupling agent added thereto, and wherein the ABS sensor cable comprises a sensor portion of an ABS sensor integrated at an end of the ABS sensor cable by a resin mold.

(vi) The complex harness further comprises a separator between the outer and inner sheaths to reduce a fusion-adhesion therebetween.

(vii) The separator comprises a metal and is disposed covering the ABS sensor cable.

(viii) The complex harness further comprises a shield conductor disposed covering a power wire of the electric brake cable.

(ix) The electric brake cable is used as a conducting path for passing an electric current to operate a mechanism of preventing rotation of wheels after stopping a vehicle.

Effects of the Invention

According to one embodiment of the invention, a complex harness can be provided that allows the efficient use of the wiring space of a vehicle and the facilitation of the wiring work.

BRIEF DESCRIPTION OF THE DRAWINGS

Next, the present invention will be explained in more detail in conjunction with appended drawings, wherein:

FIGS. 1A and 1B are diagrams illustrating a complex harness in an embodiment of the present invention, wherein FIG. 1A is a plan view and FIG. 1B is a cross sectional view taken on line 1B-1B;

FIGS. 3A and 3B are cross sectional views showing complex harnesses in another embodiment of the invention; and FIGS. 4A and 4B are diagrams illustrating a complex harness in a modification of the invention, wherein FIG. 4A is a plan view and FIG. 4B is a cross sectional view taken on line 4B-4B.

DETAILED DESCRIPTION OF THE PREFERRED EMBODIMENTS

The embodiment of the invention will be described below in conjunction with the appended drawings.

Figure 1A:
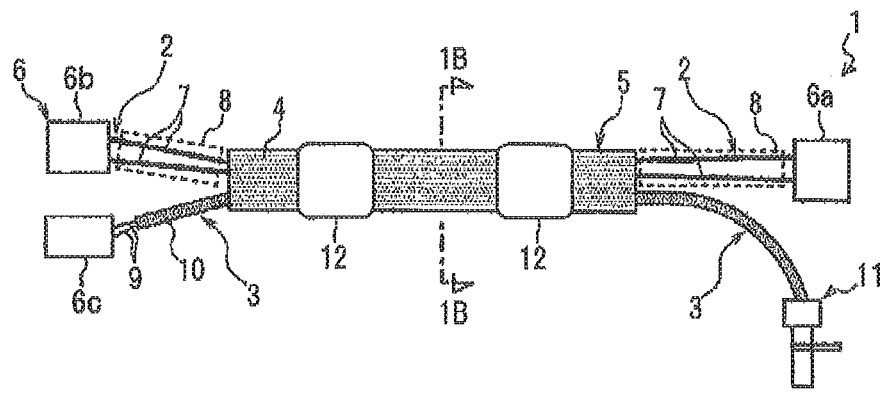
Figure 1B:
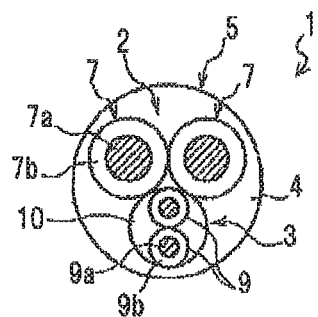

FIGS. 1A and 1B are diagrams illustrating a complex harness in the present embodiment, wherein FIG. 1A is a plan view and FIG. 1B is a cross sectional view taken on line 1B-1B.

As shown in FIGS. 1A and 1B, a complex harness 1 is provided with a composite cable 5 composed of an electric brake cable 2 and an ABS sensor cable 3 which are integrated by covering with a common outer sheath 4. In addition, the complex harness 1 is configured such that the electric brake cable 2 and the ABS sensor cable 3 are separated at end portions of the composite cable 5 and a connector 6 is provided at an end portion of least at one of the cables 2 and 3.

The electric brake cable 2 is composed of two power wires 7 and is mainly used as a conducting path for passing an electric current which is caused to flow therethrough by pressing a given button after stopping a vehicle to operate a mechanism of preventing rotation of wheels (an electric parking brake (EPB) mechanism). In addition, it is obvious that the electric brake cable 2 can be a cable for a general electric brake other than for an electric parking brake (EPB) (e.g., a cable including a control signal wire, etc., in addition to the two power wires 7).

The power wire 7 is formed by covering a center conductor 7a with an insulation 7b. The insulation 7b is formed of, e.g., XLPE (crosslinked polyethylene) or ETFE (tetrafluoroethylene-ethylene copolymer), etc. In the electric brake cable 2, the two power wires 7 are generally covered with a sheath but, in the invention, the common outer sheath 4 is used in substitution for the sheath.

Note that, in the present embodiment, it is defined that the composite cable 5 is composed of the electric brake cable 2 and the ABS sensor cable 3 which are integrated by covering with the common outer sheath 4 but it can be said, in other words, that the composite cable 5 is composed of the electric brake cable 2 and the ABS sensor cable 3 which is integrated therewith by being embedded into a sheath (the outer sheath 4) of the electric brake cable 2.

The two power wires 7 of the electric brake cable 2 extend from both end portions of the composite cable 5. A connector 6a to be connected to a brake caliper (not shown) is provided at one of the end portions and a connector 6b to be connected to a control device (not shown) is provided at another end portion. A protector 8 formed of a tube or hose, etc., is provided around the two power wires 7 extending from the composite cable 5 on each side in order to provide a protection for the power wires 7 against chipping, etc., caused by a flipped stone.

The ABS sensor cable 3 is formed by coveting two signal wires 9 with an inner sheath 10 all together. The signal wire 9 is formed by covering a center conductor 9a with an insulation 9b. The insulation 9b is formed of, e.g., XLPE, etc. In the present embodiment, the ABS sensor cable 3 is provided so as to be in contact with the power wires 7.

In the present embodiment, the outer sheath 4 is formed of a thermoplastic resin, in more detail, a thermoplastic urethane, and the inner sheath 10 is formed of a crosslinked thermoplastic resin, in more detail, a crosslinked thermoplastic urethane. As shown in FIG. 1B, the outer sheath 4 is provided around the power wires 7 and the ABS sensor cable 3 so as to be interposed therebetween. Although the outer sheath 4 is formed by extrusion molding, it is possible to reduce melting of the inner sheath 10 due to heat and fusion-adhesion of the inner sheath 10 to the outer sheath 4 resulting therefrom at the time of forming the outer sheath 4 around the inner sheath 10 (at the time of extrusion molding) by crosslinking the inner sheath 10. As a result, the ABS sensor cable 3 can be easily separated from and taken out of the outer sheath 4 at the end portions of the composite cable 5.

Since the thermoplastic urethane used for the outer sheath 4 and the inner sheath 10 is strong against chipping caused by a flipped stone, etc., portions covered with the sheaths 4 and 10 (around the composite cable 5 and around the ABS sensor cable 3 extruding from the composite cable 5) do not need to be covered with a protector. In addition, the thermoplastic urethane is easily bent and is suitable for the complex harness 1 which is used for a wiring under a spring and is repeatedly bent.

Furthermore, in the present embodiment, a thermoplastic urethane having a silane coupling agent added thereto is crosslinked and is used as the inner sheath 10, and a sensor portion (sensor head) 11 of the ABS sensor is integrated at an end of the ABS sensor cable 3 by a resin mold. Nylon is used as the resin mold. A connector 6c to be connected to a control device (not shown) is provided at another end of the ABS sensor cable 3.

In case that the thermoplastic urethane is crosslinked, it is not possible to ensure adhesion to the resin mold (nylon, in the present embodiment). However, by performing the crosslinking treatment after adding the silane coupling agent to the thermoplastic urethane, silane coupling agent is activated and this allows adhesion to the resin mold to be improved. As a result, it is possible to ensure adhesion between the inner sheath 10 and the sensor portion 11, thereby reducing water intrusion into the sensor portion 11. Accordingly, it is possible to reduce troubles of the sensor portion 11 such as breakdown.

Grommets 12 to which a clamp for attaching the composite cable 5 to a vehicle body is fixed are attached to the composite cable 5. The grommet 12 is formed of, e.g., EPDM (ethylene propylene diene rubber). An inner diameter of the grommet 12 is expanded by air for attaching the grommet 12 to the composite cable 5, and at this time, it is difficult to attach the grommet 12 if the surface of the outer sheath 4 is not flat. Therefore, in the present embodiment, the outer sheath 4 is formed by performing extrusion molding twice to obtain the outer sheath 4 having a flat surface, thereby forming the composite cable 5 having a substantially regular outer shape.

Effects of the present embodiment will be described.

The complex harness 1 in the present embodiment is provided with the composite cable 5 composed of the electric brake cable 2 and the ABS sensor cable 3 which are integrated by covering with the common outer sheath 4.

Since the electric brake cable 2 and the ABS sensor cable 3 are integrated, it is possible to effectively use wiring space in a vehicle and to facilitate wiring work. In addition, it is possible to reduce the number of wiring parts, which facilitates parts control.

In addition, in the present embodiment, the ABS sensor cable 3 is formed by covering the two signal wires 9 with the inner sheath 10 all together, the outer sheath 4 is formed of a thermoplastic resin and the inner sheath 10 is formed of a crosslinked thermoplastic resin.

Therefore, it is possible to reduce melting of the inner sheath 10 due to heat and fusion-adhesion of the inner sheath 10 to the outer sheath 4 resulting therefrom at the time of forming the outer sheath 4 (at the time of extrusion molding), and accordingly, the ABS sensor cable 3 can be easily separated from and taken out of the outer sheath 4 at the end portions of the composite cable 5.

Furthermore, in the present embodiment, a thermoplastic urethane having a silane coupling agent added thereto is used as a material of the inner sheath 10, and the sensor portion 11 of the ABS sensor is integrated at an end of the ABS sensor cable 3 by the resin mold.

This allows the inner sheath 10 and the resin mold to be air-tightly integrated and it is thereby possible to reduce breakdown etc., of the sensor portion 11 due to water intrusion thereinto. In addition, the number of wiring parts is further reduced by integrally providing the sensor portion 11 at an end portion of the ABS sensor cable 3 and it is thus possible to further facilitate wiring work.

Meanwhile, the electric brake cable 2 is used as a conducting path for passing an electric current which is caused to flow therethrough by pressing a given button after stopping a vehicle to operate a parking brake mechanism. Therefore, the ABS sensor cable 3 which is in operation during running a vehicle does not need measures against noise from the electric brake cable 2. Therefore, it is possible to integrate the electric brake cable 2 with the ABS sensor cable 3 without providing a noise suppression shield on at least one of the electric brake cable 2 and the ABS sensor cable 3.

Next, another embodiment of the invention will be described.

Figure 2:
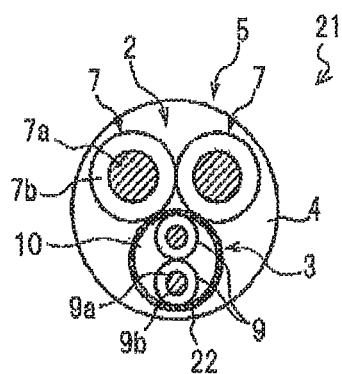
FIG. 2 is a cross sectional view showing a complex harness in another embodiment of the invention.

A complex harness 21 shown in FIG. 2 is based on the complex harness 1 shown in FIG. 1 and has a separator 22 provided between the outer sheath 4 and the inner sheath 10 to reduce fusion-adhesion thereof.

By providing the separator 22, the ABS sensor cable 3 can be easily separated from and taken out of the outer sheath 4 at the end portions of the composite cable 5 even when both of the outer sheath 4 around the inner sheath 10 are formed of a thermoplastic urethane.

Furthermore, in case that the separator 22 is formed of a metal and is provided so as to cover the ABS sensor cable 3, the separator 22 serves as a shield and this allows external noise into the signal wire 9 of the ABS sensor cable 3 to be reduced. Note that, a material of the separator 22 is not limited thereto and it is possible to use, e.g., non-woven paper, non-woven fabric (formed of, e.g., PET) or resin tape, etc.

Complex harnesses 31 and 32 respectively shown in FIGS. 3A and 3B are based on the complex harness 1 shown in FIG. 1 and have a shield conductor 33 provided so as to cover the two power wires 7 of the electric brake cable 2. FIG. 3A shows a case where the shield conductor 33 is provided so as to cover all of the two power wires 7 and the ABS sensor cable 3 and FIG. 3B shows a case where the shield conductor 33 is provided so as to cover only the two power wires 7. Both structures are adoptable. Alternatively, the shield conductor 33 may be provided so as to cover only the ABS sensor cable 3. In case that the shield conductor 33 is provided so as to cover all of the power wires 7 and the ABS sensor cable 3 as shown in FIG. 3A, an inclusion 34 is inserted inside the shield conductor 33, i.e., around the power wires 7 and the ABS sensor cable 3. Meanwhile, by providing the shield conductor 33 so as to cover only the two power wires 7 as shown in FIG. 3B, it is possible to reduce noise into the ABS sensor cable 3 which is in operation during running a vehicle even when the electric brake cable 2 is also used for passing an electric current during running a vehicle to slow down the vehicle, not only after stopping the vehicle. This allows the electric brake cable 2 and the ABS sensor cable 3 to be integrated even when the electric brake cable 2 is also used for passing an electric current during running a vehicle to slow down the vehicle, not only after stopping the vehicle.

Providing the shield conductor 33 allows radiation noise from the power wires 7 to be suppressed, thereby taking EMI (electromagnetic interference) measures. In addition, when providing the shield conductor 33, the shield conductor 33 serves as a separator which separates the ABS sensor cable 3 from the outer sheath 4, which reduces fusion-adhesion of the inner sheath 10 to the outer sheath 4 and allows the power wires 7 and the ABS sensor cable 3 to be easily separated.

Furthermore, it is possible to provide non-woven paper, non-woven fabric (formed of, e.g., PET) or resin tape, etc., in place of the shield conductor 33 in FIG. 3A. Providing the non-woven paper or non-woven fabric in place of the shield conductor 33 allows fusion-adhesion of the inner sheath 10 to the outer sheath 4 to be reduced, and at the same time, rubbing between the power wires 7 or the ABS sensor cable 3 and the outer sheath 4 to be reduced and the power wires 7 or the ABS sensor cable 3 to easily move (slip) in the outer sheath 4, which reduces stress due to bending and thus allows flexing endurance to be improved.

It should be noted that the invention is not intended to be limited to the above-mentioned embodiments, and it is obvious that the various kinds of modifications can be added without departing from the gist of the invention.

For example, the ABS sensor cable 3 is formed by covering the two signal wires 9 with the inner sheath 10 all together in the embodiments, it is possible to omit the inner sheath 10 as shown in FIGS. 4A and 4B. In this case, the signal wires 9 extend from the end portions of the composite cable 5 and it is therefore necessary to provide protectors 42 formed of a tube or hose, etc., on the exposed portions of the signal wires 9 in order to provide a protection against chipping, etc., caused by a flipped stone. However, in this case, adhesion of the insulation 9b of the signal wire 9 (e.g., XLPE) to the resin mold (e.g., nylon) is not good enough and it is not possible to integrate the sensor portion 11 by the resin mold. Therefore, a connector 43 is provided on the signal wires 9 at one end and the sensor portion 11 is connected to the connector.

In addition, the electric brake cable 2 may also be covered with an inner sheath in the same manner as the ABS sensor cable 3 even though it is not mentioned in the embodiments. In this case, in order to prevent fusion-adhesion of the inner sheath to the outer sheath 4, a crosslinked thermoplastic urethane is used for the inner sheath, or, a separator is interposed between the inner sheath and the outer sheath 4. This allows the protector 8 to be omitted and wiring work to be facilitated.

Furthermore, although the outer sheath 4 formed of a thermoplastic urethane has been described in the embodiments, it is not limited thereto and the outer sheath 4 may be formed of EPDM. Since compression set (creep) is less likely occur in EPDM, forming the outer sheath 4 from the EPDM allows a clamp to be directly fixed to the outer sheath 4 without attaching the grommet 12 and it is thus possible to further facilitate wiring work. Note that, since compression set (creep) is likely occur in the thermoplastic resin, it is not possible to directly fix a clamp thereto and the grommet 12 needs to be provided.

Still further, it is obviously possible to integrate another insulated wire such as disconnection detection line in addition to the electric brake cable 2 and the ABS sensor cable 3 even though it is not mentioned in the embodiments.

What is claimed is:

1. A harness for a vehicle, configured to be attachable to a vehicle body, the harness comprising:
   a cable comprising a plurality of electric wires, each of which comprises a center conductor and an insulation that covers the center conductor, and an outer sheath that comprises a thermoplastic urethane and covers the plurality of electric wires;
   a rubber member provided along a longitudinal direction of a part of the cable, the rubber member including ethylene propylene diene rubber; and
   a fixing member for attaching the cable to the vehicle body, wherein the fixing member is attached to an outer surface of the outer sheath through the rubber member, wherein the plurality of electric wires includes two first electric wires that are free of a shield conductor and two second electric wires each having a cross-sectional area smaller than a cross-sectional area of each of the two first electric wires, wherein the two second electric wires are in contact with each other, wherein a cross-sectional area of the center conductor of the first electric wire is larger than a cross-sectional area of the second electric wire, wherein the two first electric wires are in contact with each other, wherein the two second electric wires are collectively covered by an inner sheath together, and wherein a part of the inner sheath is disposed in a space between the two first electric wires contacting with each other.

2. The harness according to claim 1, wherein the rubber member comprises a plurality of rubber members provided along the longitudinal direction of the part of the cable, wherein the fixing member is attached to the outer surface of the outer sheath comprising a thermoplastic urethane through one of the plurality of rubber members comprising ethylene propylene diene rubber, and wherein the plurality of rubber members are distant from both ends of the outer sheath.

3. The harness according to claim 2, wherein a part of the plurality of electric wires extends from one of the both ends of the outer sheath in a state where the part of the plurality of electric wires is collectively covered by the inner sheath.

4. The harness according to claim 3, wherein a sensor head is integrated by a resin mold at an end of the inner sheath.

5. The harness according to claim 2, wherein the cable further comprises a separator that contacts with the outer sheath.

6. The harness according to claim 1, wherein a part of the plurality of electric wires extends from an end of the outer sheath in a state where the part of the plurality of electric wires is collectively covered by the inner sheath.

7. The harness according to claim 6, wherein a sensor head is integrated by a resin mold at an end of the inner sheath.

8. The harness according to claim 7, wherein the inner sheath and the resin mold are air-tightly integrated.

9. The harness according to claim 6, wherein the plurality of electric wires is movable in the outer sheath.

10. The harness according to claim 6, wherein the inner sheath comprises a crosslinked thermoplastic urethane.

11. The harness according to claim 6, wherein a material of the inner sheath includes a silane coupling agent.

12. The harness according to claim 1, wherein the cable further comprises a separator that contacts with the outer sheath.

13. The harness according to claim 1, wherein the plurality of electric wires is movable in the outer sheath.

14. The harness according to claim 1, wherein the insulation comprises crosslinked polyethylene or a tetrafluoroethylene-ethylene copolymer.

15. The harness according to claim 1, wherein the inner sheath abuts outer surfaces of the two first electric wires.

16. The harness according to claim 1, wherein outer surfaces of the two second electric wires abut each other, and wherein outer surfaces of the two first electric wires abut each other.

17. The harness according to claim 1, wherein the two second electric wires are positioned on a same side of a straight line connecting between respective centers of the center conductors of the two first electric wires.

18. A harness for a vehicle, configured to be attachable to a vehicle body, the harness comprising:

a cable comprising a plurality of electric wires, each of which comprises a center conductor and an insulation that covers the center conductor, and an outer sheath that comprises a thermoplastic urethane and covers the plurality of electric wires;

a rubber member provided along a longitudinal direction of a part of the cable, the rubber member including ethylene propylene diene rubber; and a fixing member for attaching the cable to the vehicle body, wherein the fixing member is attached to an outer surface of the outer sheath through the rubber member, wherein the plurality of electric wires includes two first electric wires that are free of a shield conductor and two second electric wires each having a cross-sectional area smaller than a cross-sectional area of each of the two first electric wires, wherein the two second electric wires are in contact with each other, wherein a cross-sectional area of the center conductor of the first electric wire is larger than a cross-sectional area of the second electric wire, wherein the two second electric wires are collectively covered by an inner sheath together, wherein the inner sheath is in contact with the two first electric wires, wherein the inner sheath is disposed in a space between the two second electric wires, and wherein the outer sheath is disposed in a space between the two first electric wires and a space between the first electric wires and the inner sheath.

* * * * *